US006400773B1

(12) United States Patent
Krongold et al.

(10) Patent No.: US 6,400,773 B1
(45) Date of Patent: Jun. 4, 2002

(54) SECTION DIVISION OPERATING POINT DETERMINATION METHOD FOR MULTICARRIER COMMUNICATION SYSTEMS

(75) Inventors: Brian Scott Krongold; Kannan Ramchandran; Douglas L. Jones, all of Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/326,246

(22) Filed: Jun. 4, 1999

(51) Int. Cl.[7] .............................................. H04L 27/28
(52) U.S. Cl. ...................... 375/260; 375/295; 370/484
(58) Field of Search ................................ 375/260, 295; 370/480, 484

(56) References Cited

U.S. PATENT DOCUMENTS

| 4,679,227 A | 7/1987 | Hughes-Hartogs ........... 379/98 |
| 4,731,816 A | 3/1988 | Hughes-Hartogs ........... 379/98 |
| 4,833,706 A | 5/1989 | Hughes-Hartogs ........... 379/98 |
| 5,400,322 A | 3/1995 | Hunt et al. .................... 370/19 |
| 5,479,447 A | 12/1995 | Chow et al. ................. 375/260 |
| 5,495,484 A | 2/1996 | Self et al. ................... 370/110.1 |
| 5,521,906 A | 5/1996 | Grube et al. .................. 370/17 |
| 5,598,435 A | 1/1997 | Williams .................... 375/261 |
| 5,812,599 A | 9/1998 | Van Kerckhove ........... 375/260 |
| 5,822,374 A | 10/1998 | Levin .......................... 375/260 |
| 5,832,387 A | 11/1998 | Bae et al. .................... 455/522 |

OTHER PUBLICATIONS

B.S. Krongold, K. Ramchandran, D.L. Jones, "Computationally Efficient Optimal Power Allocation Algorithm for Multicarrier Communications Systems", Proceedings of the International Conference on Communications, Atlanta, GA, Jun. 1998.

B.S. Krongold, K. Ramchandran, D.L. Jones, "Computationally Efficient Optimal Power Allocation Algorithms for Multicarrier Communications Systems", in preparation to be submitted to *IEEE Transactions on Communications*.

B.S. Krongold, "Power and Power and Bandwidth Optimization for Multicarrier Communication Systems", M.S. Thesis, University of Illinois at Urbana–Champaign, Sep. 1997.

S. Pradhan and K. Ramchandran, "Efficient Layered Video Delivery over Multicarrier Systems using Optimized Embedded Modulation", Proceedings of the International Conference on Image Processing (ICIP), Santa Barbara, CA, Jun. 1998.

S. Pradhan and K. Ramchandran, "Optimized Embedded Multicarrier Modulation for Efficient Delivery of Layered Video Data", Proceedings of the International Conference on Communications, Atlanta, Georgia, Jun. 1998.

(List continued on next page.)

*Primary Examiner*—Amanda T. Le
(74) *Attorney, Agent, or Firm*—Greer, Burns & Crain, Ltd.

(57) ABSTRACT

Optimum bit rates and power levels are determined for subchannels in multicarrier communication systems. A tangent of the rate-power curve has a slope $\lambda$. The slope is defined by the quotient difference between high/low power and high/low rate. A particular $\lambda$ is evaluated to find its corresponding total power followed by an update of $\lambda$, in the form of an increase or decrease, to get closer to the optimal solution. Each $\lambda$ is evaluated to find the optimal operating point for each subchannel on the rate-power curve by summing the power allocated to the subchannels, and comparing the result to the power budget. Look-up tables are stored for individual channels, but similarity between channels permits joint use of look-up tables by multiple channels. The tables are used to determine the rate-power characteristics at each iteration. An optimal solution is found when either a newly chosen power allocation meets the power budget exactly or a newly chosen power budget equals the high or low power of a previous iteration.

19 Claims, 6 Drawing Sheets

OTHER PUBLICATIONS

Y. Shoham and A. Gersho, "Efficient Bit Allocation for an Arbitrary Set of Quantizers", *IEEE Transactions on Acoustics, Speech and Signal Processing,* vol. 36, Sep. 1988, pp. 1445–1453.

K. Ramchandran and M. Vetterli, "Best Wavelet Packet Bases in a Rate–Distortion Sense", *IEEE Transactions on Acoustics, Speech and Signal Processing,* vol. 2, Apr. 1993, pp. 160–175.

B.S. Krongold, K. Ramchandran, D.L. Jones, "An Efficient Algorithm for Optimal Margin Maximization in Multicarrier Communication Systems", in IEEE Globecom '99, Rio de Janeiro, Brazil, Dec. 1999.

J. Campello, "Practical Bit Loading for DMT", in Proc. ICC '99, Vancouver, Canada, Jun. 1999.

P.S. Chow, "Bandwidth Optimized Digital Transmission Techniques for Spectrally Shaped Channels with Impulse Noise", Chapter 4, Ph.D. Thesis, Stanford University, 1993.

A. Leke, J.M. Cioffi, "A Maximum Rate Loading Algorithm for Discrete Multitone Modulation", in *Proc. Globecom '97,* Phoenix, Nov. 1997, pp. 1514–1518.

R.F.H. Fischer, J.B. Huber, "A New Loading Algorithm for Discrete Multitone Transmission", *Proc. IEEE Globecom '96,* (London), Nov. 1996, pp. 724–728.

P.S. Chow, J.M. Cioffi, J.A.C. Bingham, A Practical Discrete Multitone Transceiver Loading Algorithm for Data Transmission over Spectrally Shaped Channels, *IEEE Transactions on Communications,* vol. 43, No. 2, Feb./Mar./Apr., 1995, pp. 773–775.

A. Vahlin, N. Holte, "OFDM for Broadcasting in Presence of Analogue Co–Channel Interference", *IEEE Transactions on Broadcasting,* vol. 41, Sep. 1995, pp. 89–93.

SECTION DIVISION OPERATING POINT DETERMINATION METHOD FOR MULTICARRIER COMMUNICATION SYSTEMS

FIELD OF THE INVENTION

The present invention concerns allocation of quantities affecting performance for multicarrier communication systems. The present invention more particularly concerns, for example, processes that are capable of producing an optimal power allocation in such communication systems, an optimal bit allocation and/or an optimal performance margin allocation.

BACKGROUND OF THE INVENTION

High speed data communication over both wired and wireless transmission media can be accomplished using various multicarrier communication methods in which a channel is divided into many subchannels that are essentially independent and free of intersymbol interference (ISI). Phase and/or amplitude modulation are used to increase the number of symbols which can be transmitted per unit time in the multicarrier communication methods.

A signal constellation is a communication method defined by points on a phase map that indicate the particular phase and amplitude for various symbols encoded by the method. As an example, an 8 PSK signal constellation has all its information encoded in phase, with 8 possible values per unit time at 45 degree phase separations. That amount of information encoding can be doubled by also having two possible amplitudes. Various encoding schemes known in the art are accurately described by their signal constellations.

Separations in phase and amplitude must be adequately maintained in a physical realization of coding points in a given signal constellation to avoid excessive coding errors. This is because the signal constellation imposes limits on the decoding side, which must determine, based upon received phase and amplitude information, which symbol is intended in a given transmission interval. Accordingly, given some power budget, it must be determined how power and bits are allocated to each subchannel to maximize performance under the restrictions that the signal constellations place on the system. This optimization is done to use power efficiently and to perform as well as a single channel solution. Because typical multicarrier systems can currently have as many as 256 channels and further increases are likely, the power allocation problem becomes complex, rendering fast allocation in real time difficult. The problem is further rendered difficult by the discrete nature of typically used integer-bit constellations that render the optimal power allocation solution to be a solution of a discontinuous integer programming problem, one that is difficult to solve by direct methods.

Other signal constellations of interest are those not having the integer-bit constellation restraint. Consider, for example, the alternate signaling scheme of 5 bits/symbol followed by 4 bits/symbol. This obtains a half bit granularity of 4.5 bits/symbol. Reported half bit improvements of up to 1 dB indicate the promise of half bit granularity. These constellations share the allocation problems of the integer-bit restrained constellations described above. Prior methods for power, bit and margin allocation have addressed these problems, in part, but typical methods either fail to reach optimal solutions or have a high computational cost of solution.

An exemplary method is commonly known as the Hughes-Hartog Algorithm, and is the subject of U.S. Pat. Nos. 4,679,227, 4,731,816 and 4,833,706, all of which are incorporated by reference in their entirety. This algorithm achieves an optimal power allocation. It begins by assigning no power and no bits to each of the subchannels. Then the subchannel which requires the least amount of power to increase its data rate is given that amount of power and that process is repeated until the power budget is exhausted. The algorithm accordingly has a slow convergence to solution and has an associated high computational cost.

Another known type of method is the subject of U.S. Pat. Nos. 5,479,447 and 5,400,322, both of which are incorporated by reference in their entirety. These algorithms use nearest-neighbor approximations and round the estimated bit allocations to integer numbers. Computational costs are less than in the Hughes-Hartog algorithm, but these methods do not present an ability to guarantee an optimal solution where one is desired. The '322 patent updates power and bit allocations after slight changes in channel condition, but still is only capable of guaranteeing a suboptimal solution because of the generally ad hoc approach to arrive at a solution that lacks any theoretical basis for being optimal.

Other methods are disclosed in U.S. Pat. No. 5,598,435 (incorporated by reference in its entirety) to improve upon the previously known Hughes-Hartog and nearest-neighbor approaches through extension to the case of noninteger bits/symbols. These methods nonetheless share the aforementioned drawbacks of their predecessors. The improvement on Hughes-Hartog still has significant computational expenses, while the improvement on nearest-neighbor approaches lacks any ability to guarantee an optimal solution. Other types of methods which have significant computational expense as a result of a large required number of iterations are disclosed in U.S. Pat. Nos. 5,495,484 and 5,521,906, both of which are incorporated by reference in their entirety.

Thus, there is a need for an improved allocation method for multicarrier communication systems which addresses the aforementioned drawbacks. It is an object of the invention to provide such an improved method which has a computational cost suitable to real time application of the method and which can produce an optimal solution when such solution is desirable.

SUMMARY OF THE INVENTION

These and other objects and needs are met or exceeded by the present power allocation method. The method utilizes efficient look-up table searches and a Lagrange multiplier section division search to provide a capability to converge to the optimal solution. The total cost of the algorithm is O(N) where N=the number of subchannels. Minimizing the Lagrange cost for the multiplier $\lambda$ which merges rate and power in a given subchannel results in a slope $\lambda$ that corresponds to the optimal power allocation for some total power budget. The cost is minimized when rate and power for each subchannel are chosen to correspond to the point on the rate versus power curve at slope $\lambda$. Similarly, a bit or margin allocation may be obtained by solving for $\lambda$ on an appropriate curve. As used herein and in the art, curves constitute a discrete set of points representing, for example, a group of rate-power combinations. Associated values of $\lambda$ for a particular point are a continuous range.

The present invention renders the determination of the appropriate $\lambda$ from its range of values to be one of a low computational cost for bit, power or margin allocation. A particular $\lambda$ is evaluated to find its corresponding total power, followed by an update of values defining a range surrounding λ, in the form of an increase or decrease, to get closer to the optimal solution. The updated or new slope λ is defined by the quotient of the difference between high and low power divided by the difference between the high and low rate. Each λ is evaluated to find the optimal operating point for each subchannel on the rate-power curve by summing the power allocated to the subchannels, and comparing the result to the power budget. Look-up tables are stored for individual channels, but similarity between channels (due to commonality of signal constellations) permits joint use of look-up tables by multiple channels. The tables are used to determine the rate-power characteristics at each iteration. An optimal solution is guaranteed when either a newly chosen power allocation meets the power budget exactly or a newly chosen power budget equals the high or low power of a previous iteration. Margin optimization is also achieved through the invention through the update process, where the update is conducted to converge upon a target bit rate as opposed to a target power budget.

DETAILED DESCRIPTION OF THE INVENTION

Figure 1:
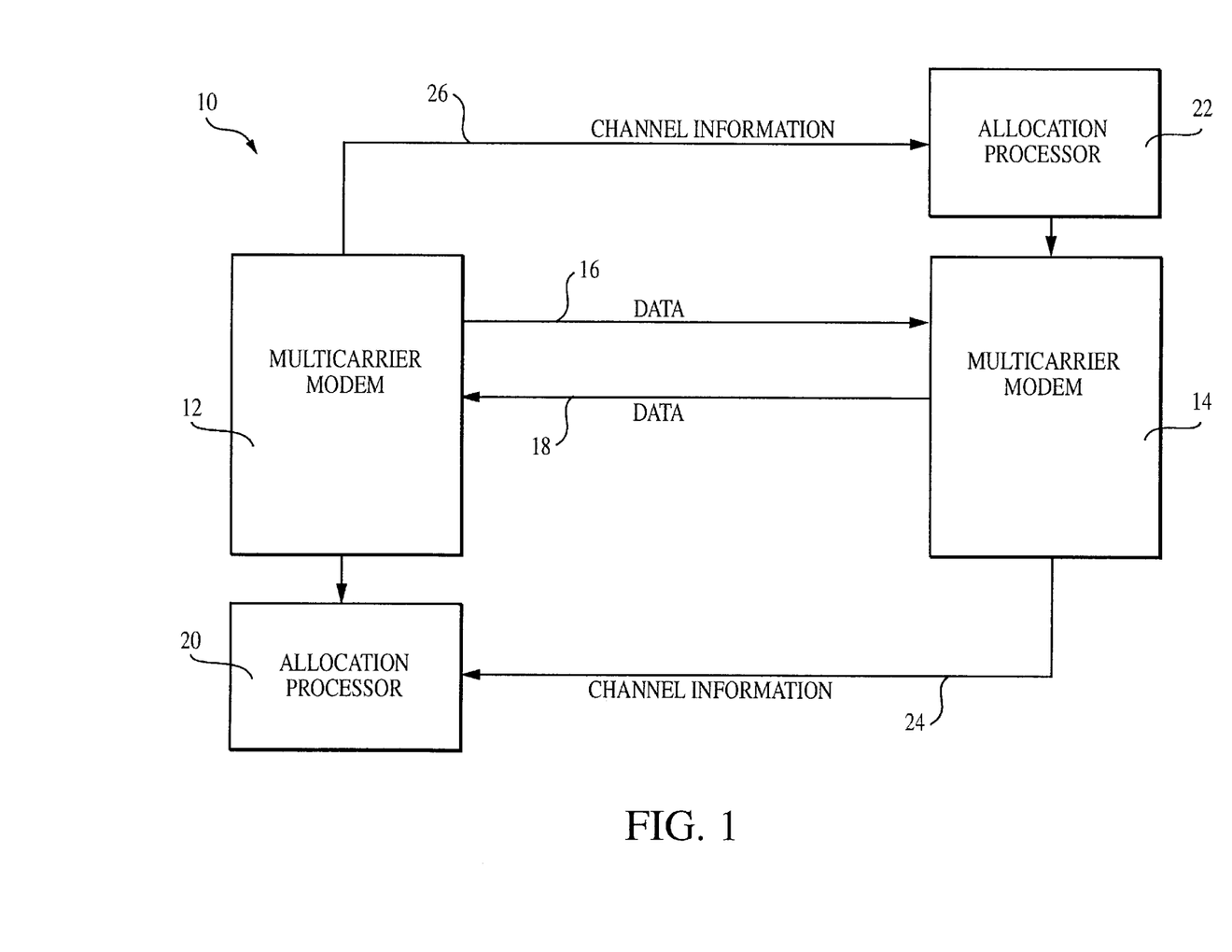
FIG. 1 is a block diagram of a multicarrier system using the allocation process of the present invention.

As seen in FIG. 1, a multicarrier system 10 includes two multicarrier modems 12, 14 which exchange data over data routes 16, 18. Each modem 12, 14 can send and receive one or more carriers, each of which might be multiplexed to have a number of subchannels. The power and number of bits allocated to each carrier and subchannel can be individually selected and controlled by allocation processors 20–22. The allocation processor 20 controls modem 1 using channel information received by modem 14 through a route 24, and the allocation processor 22 controls the modem 14 using information received from the modem 12 on a route 26. The allocation processors 20, 22 can adjust the power and number of bits in each subchannel of each carrier, although the total power and the number of bits on the routes 16, 18 must be maintained within predetermined limits.

The power allocation problem to be solved through the present invention stems from the classic information theory problem of achieving the maximum capacity of a spectrally-shaped Gaussian channel, for which the optimal solution is the well-known water-pouring distribution. The theoretical allocation goal of the multicarrier system is to maximize the overall data rate or performance subject to a bit error probability and total power constraint. In terms of a practical multicarrier implementation, a serious restriction on subchannel power allocation is the requirement of signal constellations encoding an integer (or integer fraction) number of bits per symbol. This is an integer programming problem, which are generally known to be expensive and difficult to solve.

The present invention utilizes a Lagrange multiplier to determine, through a section search, the appropriate operating point on a discretized rate power curve. A relationship which merges rate and power through a Lagrange multiplier is first developed in the continuous rate case, and is next applied to the discretized curve produced as a result of integer-bit constellation restrictions being applied.

The following parameters are used in formulating the optimal solution of the allocation problem for the continuous rate case.

$R_i$: Bit rate in the ith subchannel in bits/symbol.
N: The number of multicarrier subchannels.
$P_i$: Power allocated to the ith subchannel.
$P_{e,i}$: Bit error probability in the ith subchannel.
$P_{budget}$: The maximum power that the multicarrier system can allocate.
$P_{error}$: Maximum probability of error constraint.
$2\sigma_i^2$: The noise power in the ith subchannel.
$|H_i|^2$: The channel (or carrier) power gain in the ith subchannel.
T: Symbol rate.

$$SNR_i = \frac{P_i T |H_i|^2}{2\sigma_i^2}:$$

ith subchannel signal-to-noise ratio.

$$CNR_i = \frac{T|H_i|^2}{2\sigma_i^2}:$$

ith subchannel carrier-to-noise power ratio.

Using these parameters, the power allocation optimization problem for the rate maximization case can be formulated as follows:

$$\max \sum_{i=1}^{N} R_i$$

subject to $$\sum_{i=1}^{N} P_i = P_{budget} \text{ and } \mathcal{P}_{e,i} \leq \mathcal{P}_{error} \forall i \qquad (1)$$

This is a constrained optimization problem which is difficult to solve in its above form. An equivalent, yet easier, problem to solve is obtained by reformulating Equation 1 as an unconstrained optimization problem by merging rate and power through the Lagrange multiplier, λ. The new goal is as follows:

$$\min J(\lambda) = -\sum_{i=1}^{N} R_i + \lambda \sum_{i=1}^{N} P_i \qquad (2)$$

where J(λ) is the Lagrange cost and λ≧0. This solution requires that rate be a convex function of power, which is the case in virtually every standard class of communications signal constellation. When this is not true, the solution is only optimal to within a convex-hull approximation. Each minimum Lagrange cost for a fixed λ corresponds to the optimal power allocation for some total power budget.

For a fixed $\lambda$, the Lagrangian cost is minimized when $$\frac{\partial J(\lambda)}{\partial P_i} = 0$$

for all i, or more precisely:

$$\frac{\partial R_i}{\partial P_i} = \lambda \text{ for } i = 1, 2, 3, \ldots, N. \quad (3)$$

Thus, the cost is minimized when rate and power for each subchannel are chosen to correspond to the point on the rate versus power curve at slope $\lambda$. The total power allocated for a fixed $\lambda$ is obtained by simply summing the power allocated to the subchannels $\lambda^*$ is the optimal solution. The goal is to find the particular $\lambda^*$ such that the total power allocated exactly equals the given value of $P_{budget}$ in the problem. In the continuous rate-power case, $\lambda^*$ is a unique value. In the practical discretized case, however, $\lambda^*$ is a continuous range of values and an appropriate $\lambda^*$ must be obtained from the range of values.

Another formulation of the minimum Lagrange cost can be derived from the fact that rate is also a function of the signal to noise ratio. Taking derivatives with respect to $SNR_i$ and applying the chain rule, the following minimization criterion is obtained:

$$\frac{\partial R_i(SNR_i)}{\partial (SNR_i)} CNR_i = \lambda \text{ for } i = 1, 2, 3, \ldots, N. \quad (4)$$

The power allocated to each subchannel is easily computed from the signal to noise ratio at which the subchannel is to operate, so this criterion can also be used to solve Equation 1.

The restriction of integer-bit constellations may now be applied. The new rate-power curve is a sampled version of the continuous rate-power curve at points which correspond to integer-bit constellations. These points are the operating points for a given communication system since they constitute the only admissible rate-power combinations that satisfy the integer-bit constellation restriction.

Figure 2A:
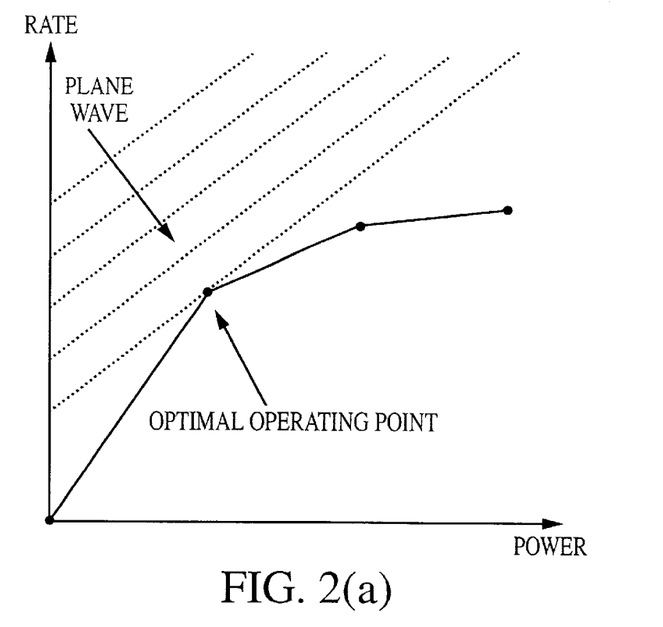
FIG. 2(a) depicts a plane wave of slope λ impinging on a rate versus power convex hull discretized curve.

These discretized rate-power curves are not continuous and not differentiable, and Equation 3 may therefore not be directly applied to obtain the optimal power allocation for a given $\lambda$. However, Equation 3 lends itself to an alternative interpretation that is useful for solving the constrained problem. The optimal operating point for the ith subchannel for a given $\lambda$ can be shown to be the point which is first "impinged upon" by a "plane-wave" of slope $\lambda$, as shown in FIG. 2(a). The plane wave concept is useful in producing a constrained optimal solution according to the present invention. In a generalized sense, this is the line of slope $\lambda$ which is tangent to the rate-power curve, and because the rate-power curve is not continuously differentiable, each operating point does not have a unique $\lambda$ associated with it. These same principles for the integer-bit restriction can also be applied to the alternative formulation in Equation 4.

Figure 2B:
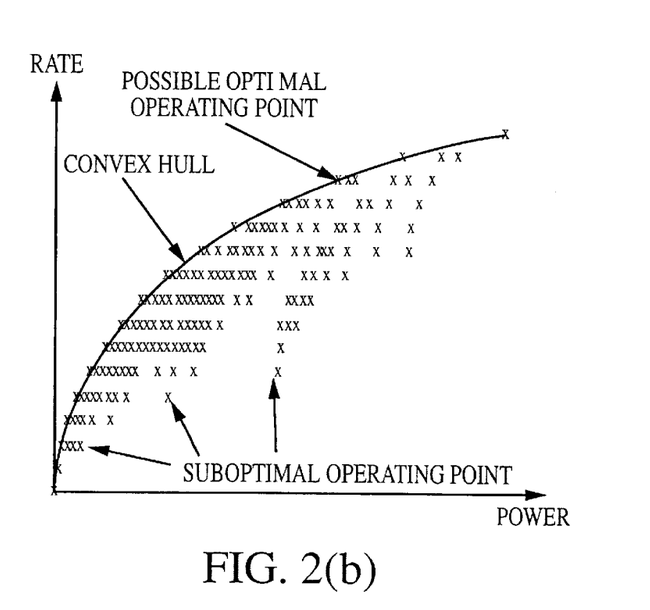
FIG. 2(b) is an exemplary composite rate-power curve for three subchannels with up to five bits per symbol.

The composite rate-power curve consists of all possible power-rate combinations for each subchannel summed together. An example of this is shown in FIG. 2(b). The lines connecting the upper-left-most operating points form the convex hull of the total rate-power curve. This set of points represents all of the possible optimal operating points. For a given $P_{budget}$, the optimal operating point is the one whose power is closest, without exceeding, the power budget.

Computing the aggregate rate-power curve is too expensive for real time solutions, however. The present invention avoids this by evaluating a particular value of $\lambda$ to find its corresponding total power, followed by an update of $\lambda$ to get closer to the optimal solution. $\lambda$ is increased for a next iteration when the power budget is exceeded during a given iteration. $\lambda$ is decreased for a next iteration when the power budget is not achieved during a given iteration.

While searching for some optimal value $\lambda^*$, which corresponds to the optimal power allocation for a given $P_{budget}$, each $\lambda$ encountered during the search must be evaluated to determine the total power it allocated. This requires finding the optimal operating point for each subchannel on the rate-power curve using Equation 3, summing the power allocated to the subchannels, and comparing the result to $P_{budget}$.

Using the alternative Lagrange minimization formulation of Equation 4, the optimal operating point for each subchannel rate-SNR curve can be obtained by simply computing the operating point which corresponds to slope $$\beta_i = \frac{\lambda}{CNR_i}$$

for a given $\lambda$. When the number of subchannels is on the order of 256 or 512 as in typical DMT systems, the cost of this computation is extremely high. However, for M different operating points for a subchannel (each corresponding to a different QAM constellation, for example), there are M different ranges of $\beta$, one for each operating point. These $\beta$ ranges are precomputed and placed into a lookup table to avoid real-time computation. Thus, each subchannel has a look-up table for quickly finding the optimal operating point on its rate-SNR curve.

Storing N lookup tables can also be somewhat expensive. However, in practice, all or most of the subchannels have identical rate-SNR operating curves; i.e., the available signal constellations and $P_{error}$ constraint are the same, and the only difference between them are the CNRs. Consequently, the $\beta$ ranges for these channels will be identical and only one look-up table need be stored. For any remaining subchannels with different rate-SNR characteristics, different look-up tables must be defined. Any redundancy in these rate-SNR curves can also be exploited.

Following the computation of $\beta_i$ for a subchannel and using the look-up table to find the rate-SNR operating point, the allocated power is computed as $$P_i = \frac{SNR(\beta_i)}{CNR_i}, P_{total} = \sum_{i=1}^{N} P_i \quad (5)$$

$$R_i = R(\beta_i), R_{total} = \sum_{i=1}^{N} R_i$$

This enables efficient computation of the optimal power allocation for each subchannel for a given $\lambda$. The remaining task is to find a $\lambda^*$, which results in the best possible power allocation scheme for a given power budget.

There are two major problems that can be encountered when trying to find a $\lambda^*$ which corresponds to the optimal power allocation. The first is converging to this optimal $\lambda^*$ quickly, while the second is the ability to recognize when an optimal solution has been reached. The section method solves both of these problems and exploits the monotonic relationship between $\lambda$ and $P_{total}$ through a binary searchlike procedure.

The section method uses two previously evaluated values of $\lambda$ which correspond to total powers where one is below and one is above $P_{budget}$. These slopes are referred to as $\lambda_{low}$ and $\lambda_{high}$ and their corresponding total rate and power parameters as $R_{low}$, $R_{high}$, $P_{low}$, and $P_{high}$, respectively.

Previously evaluated $\lambda$ values should be chosen to reflect typical channel conditions. The last known values are a preferred set of initial values representing typical channel conditions. However, in step one of the section search below, if the previous values do not satisfy the step, then it is a simple task to update one of them to satisfy the step. If typical channel conditions or last known values are not known from prior experience in operation, a conservative assumption could begin with zero power and zero bits. The least conservative approach begins with total power and maximum bits.

If prior knowledge of a system exists, the preferred way of choosing initial $\lambda$ values is to find out where typical optimal $\lambda$ values are for a system based upon prior knowledge, and then pick the initial slopes to be closely outside this range. Absent prior knowledge, one could use the worst-case initial $\lambda$'s, which are 0 and infinity. A zero value of $\lambda$ corresponds to the total power needed to achieve the maximum rate the system can send (i.e., if 256 subchannels can send at most 10 bits/symbol, then $\lambda$=0 sends 2560 bits at a power which is computed by finding out how much power each subchannel needs to send 10 bits/symbol). A slope value of infinity corresponds to a total rate of zero and a total power of zero. This is provided that an available operating point is 0-power and 0-rate for each subchannel, which should always be the case. If not, the minimum available rate for each subchannel is used. The net result is that the two worst-case $\lambda$ values can always be used to start the power allocation process in the absence of information necessary to determine $\lambda$'s based on prior knowledge.

Another possible strategy is to choose any value of $\lambda$ by an educated estimate, and compare the resulting allocation to the desired goal (target rate or power constraint). Depending upon how it meets this goal, only one of the worst-case slopes needs to be used as this initial estimate will be better than the worst-case assumption. Example: In trying to meet a target power constraint of 100 for rate maximization, an initial estimate results in a total power allocation of 56. The $\lambda$=∞ worst-case point corresponding to 0-rate and 0-power is useless as 56 is below 100 as is 0, but 56 is closer. Therefore, the initial slope values would be the estimated slope value and $\lambda$=0 corresponding to maximum total rate.

The preferred section method lowers the gap between $\lambda_{low}$ and $\lambda_{high}$ for the next iteration by choosing $$\lambda_{new} = \frac{P_{high} - P_{low}}{R_{high} - R_{low}}, \quad (6)$$

which in theory corresponds to drawing a line from the point $(R_{low}, P_{low})$ to $(R_{high}, P_{high})$ on the composite rate-power curve. This is a bisection, but other section divisions which lower the gap between $\lambda_{low}$ and $\lambda_{high}$ may be used. The total power corresponding to $\lambda_{new}$ is then evaluated. If $P_{new}$ is greater than $P_{budget}$, we update $\lambda_{high}$ with $\lambda_{new}$ while keeping $\lambda_{low}$ the same. The opposite update is done if $P_{new}$ is less than $P_{budget}$.

The slope update procedure is repeated until either the power budget is met exactly or until $P_{new}$ equals either $P_{low}$ or $P_{high}$. When the second result occurs, which will usually happen, there is no better solution available, and the power allocation corresponding to $\lambda_{low}$ is chosen to load the multicarrier system. The excess power can be added to the subchannels to lower the probability of error, or just simply not used to save power. It cannot, however, be used to increase the overall rate subject to the initial constraints.

Pseudocode for an algorithm to achieve the preferred bisection search of the invention follows. It is assumed that each subchannel uses the appropriate rate-SNR look-up table for power allocation.

1. Obtain initial values of $\lambda_{low}$ and $\lambda_{high}$ (discussed previously). Use Equation 5 to be sure that $P_{low} \leq P_{budget} \leq P_{high}$.
2. Apply the bisection method to obtain $\lambda_{new}$.

$$\lambda_{new} = \frac{P_{high} - P_{low}}{R_{high} - R_{low}}$$

3. Determine the look-up parameter $\beta_{new}^i$ for i=1, ... N and obtain rate-power characteristics $P_{new}^i$ and $R_{new}^i$ from the table.

$$\beta_{new}^i = \frac{\lambda_{new}}{CNR_i}; \quad R_{new}^i = R(\beta_{new}^i), \quad P_{new}^i = \frac{SNR(\beta_{new}^i)}{CNR_i}$$

4. Compute the total power allocation for $\lambda_{new}$ and compare it to $P_{low}$, $P_{high}$, or $P_{budget}$.

$$P_{new} = \sum_{i=1}^{N} P_{new}^i$$

If $P_{new}$ equals either $P_{low}$, $P_{high}$, or $P_{budget}$ then go to step 5. Else, if $P_{new} < P_{budget}$, then set $P_{low} = P_{new}$ and $R_{low} = R_{new}$. Store $P_{low}^i$ and $R_{low}^i$. Go to step 2. Else, set $P_{high} = P_{new}$ and $R_{high} = R_{new}$. Go to step 5.

5. Power and rate allocation is complete. If $P_{new} = P_{budget}$, assign $P_{new}^i$ and $R_{new}^i$ to the ith subchannel. Otherwise, assign $P_{low}^i$ and $R_{low}^i$ to the ith subchannel and use the small amount of left over power as desired.

Initial loading of the system may require estimates of $\lambda_{low}$ and $\lambda_{high}$ which are far from the optimum values, to ensure that the condition in step 1 is met in order to proceed with the rest of the algorithm. Prior knowledge of the system can help the designer choose initial $\lambda$ values closer to the range of optimal values, which will allow the algorithm to converge faster. Convergence of the preferred bisection method to a $\lambda^*$ is on the order of $\log_2(NM+1)$ iterations, where M is the number of signal constellations. Each $\lambda$ iteration requires (N+1) additions and 2N divisions as well as N look-up table accesses.

For tracking scenarios, when channel conditions change only slightly, it is not necessary to start from the beginning. With a slight or moderate change in channel conditions an optimal slope $\lambda^*$ will not be very different from the previous optimal slope. Therefore, initial low and high slopes can be chosen closer to the previous value to obtain faster convergence.

Figure 3A:
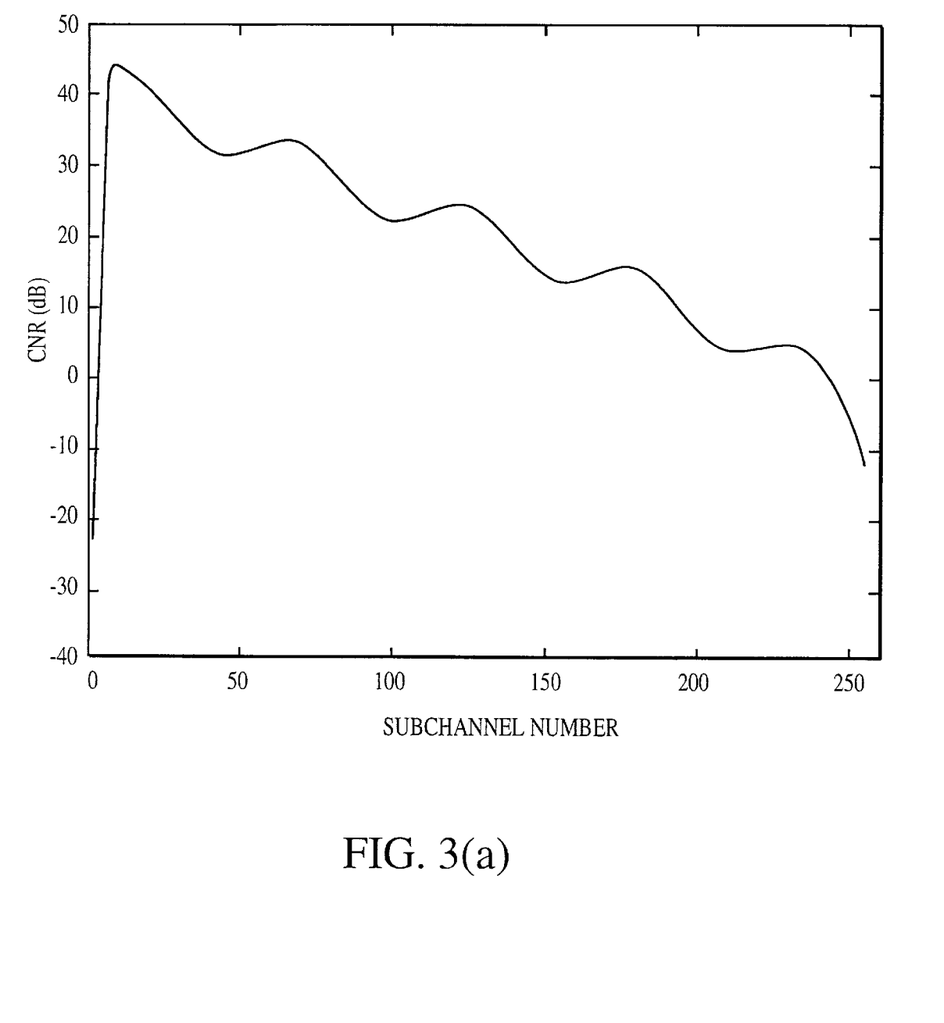
FIG. 3(a) shows the carrier (or channel) to noise ratio of a test QAM channel having a number of subchannels.
Figure 3B:
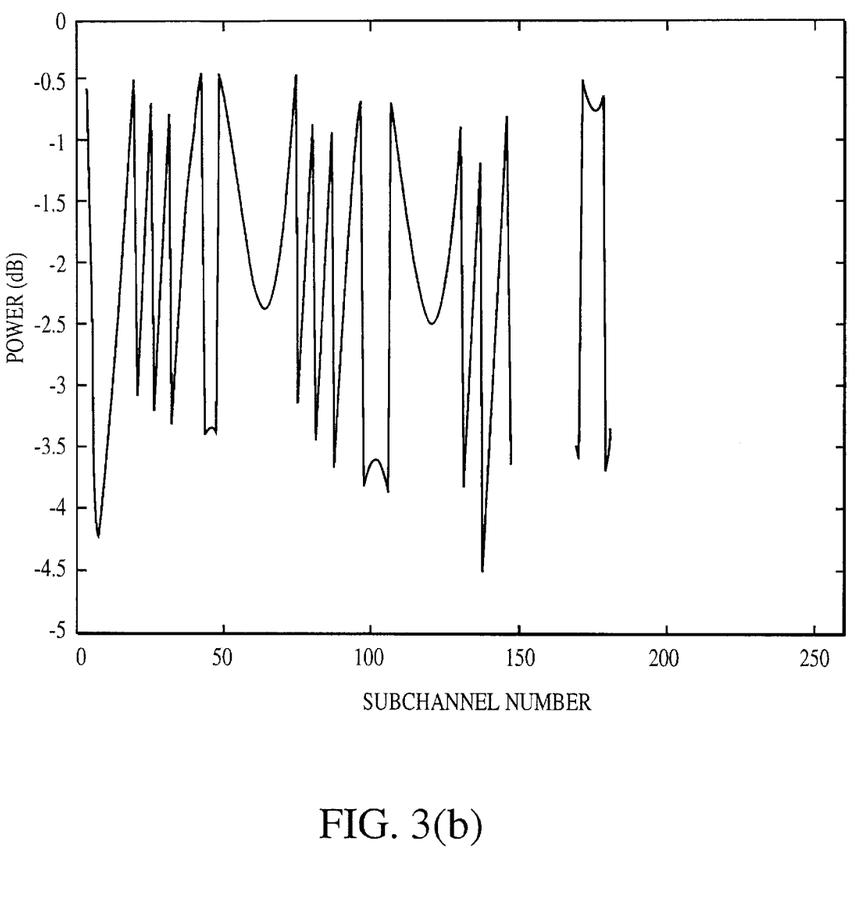
FIG. 3(b) shows the power allocation reached in 14 iterations for the test channel of FIG. 2(A)
Figure 4A:
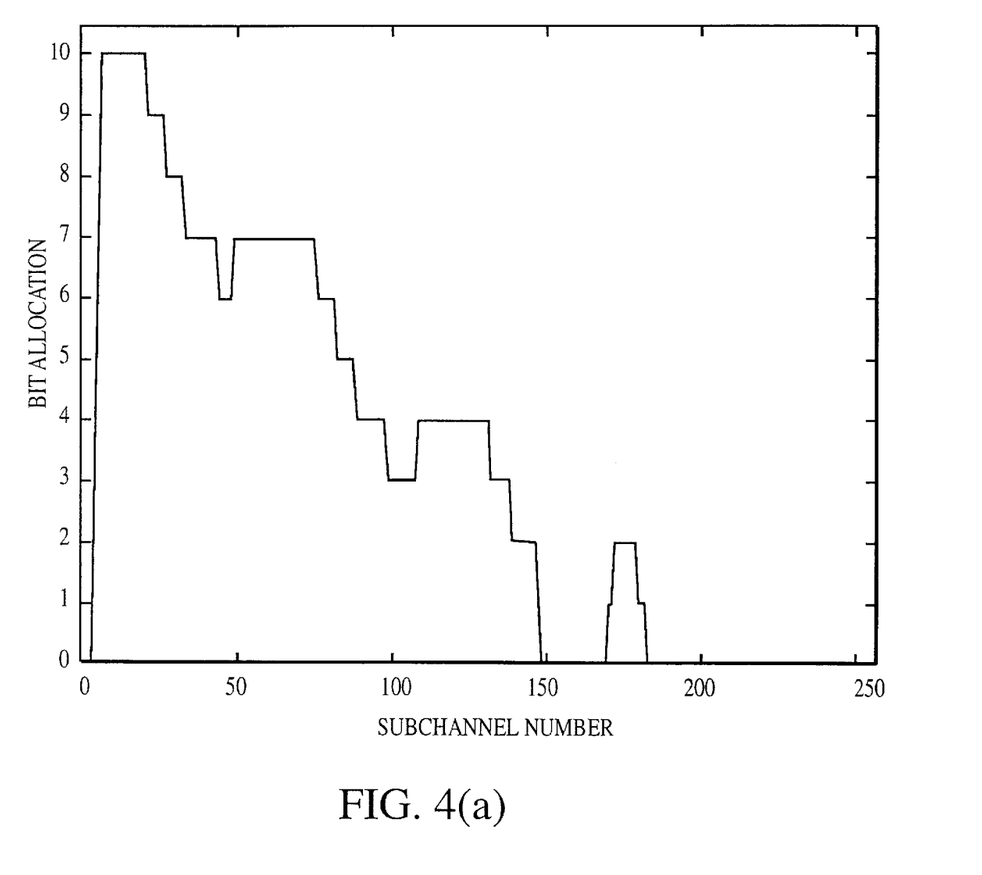
FIG. 4(a) shows the optimal bit allocation determined by the present invention.
Figure 4B:
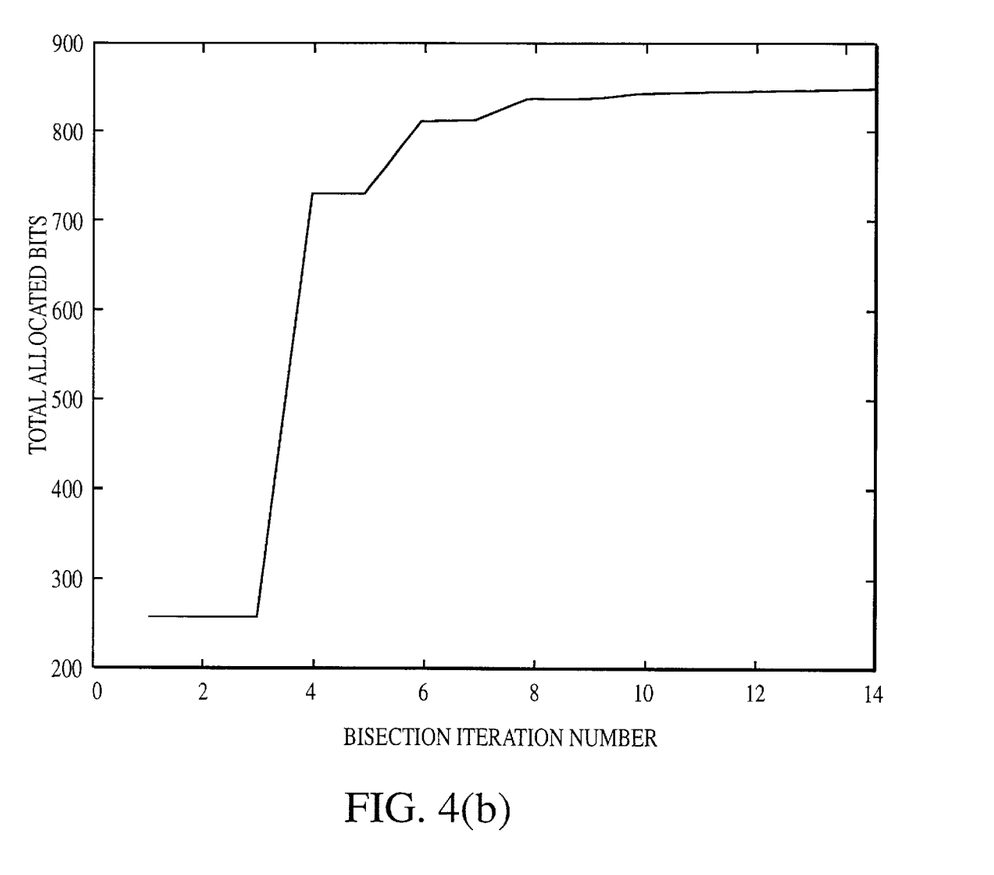
FIG. 4(b) shows total bit allocation versus iterations using the principles of the present invention.

FIG. 3(a) is a test channel showing the carrier to noise ratio (in dB) of its 512 subchannels. The available signal constellations were 0–10 bits/symbol quadrature amplitude modulation (QAM) and the symbol error probability constraint was $10^{-7}$ for each subchannel. The invention converged to the optimal solution with 14 iterations of the bisection search using conservative initial low (44) and high (0.0020) slope values. The resulting power and bit allocation for each subchannel are shown in FIG. 3(b) and FIG. 4(a), respectively. FIG. 4(b) shows the total bit allocation versus the iteration number. In this example, 98.8% of the optimal rate is achieved after only eight iterations.

Another important quantity of interest is the performance margin, $\gamma_m$, which is the amount of noise (in dB) that a system can tolerate, while still operating under the bit error probability constraint. For example, if a single channel requires a 12 dB signal to noise ratio to operate at some data rate with $P_{error}$, then providing 18 dB of signal to noise ratio results in a +6 dB performance margin. In a multicarrier system, the performance margin for each subchannel can vary, but it is more appropriate that each subchannel have the same margin, which is referred to as an overall DMT performance margin.

The performance margin optimization problem is as follows for a given target data rate:

$$\max \gamma_m \text{ subject to } \sum_{i=1}^{N} R_i = R_{target}, \quad (10)$$

$$\sum_{i=1}^{N} P_i = P_{budget} \text{ and } \mathcal{P}_{e,i} \leq \mathcal{P}_{error} \forall i$$

This problem can be simplified because performance margin is simply a scaling of the 0 dB performance margin allocated power ($\overline{P}_i$) in each subchannel by a constant amount. Thus, the minimum power allocation needed to meet the rate target with 0 dB performance margin can be found, and the resulting powers ($P_i$) can be scaled such that the total power budget is used. The new optimization problem is as follows:

$$\min \overline{P}_{min} = \sum_{i=1}^{N} \overline{P}_i \text{ subject to } \sum_{i=1}^{N} R_i = R_{target} \text{ and } \mathcal{P}_{e,i} \leq \mathcal{P}_{error} \forall i \quad (11)$$

In this case, only the convex hull operating points on the composite rate-power curve can be optimal solutions because there is no left-over power as in the rate maximization problem. The only difference from the power allocation method of the invention is that $\lambda$ is updated so that the total rate converges to $R_{target}$. Once this has been done, the final power allocation is computed by scaling the $\overline{P}_i$ so the entire $P_{budget}$ is used. The following is pseudocode for the performance margin optimization.

1. Obtain initial values of $\lambda_{low}$ and $\lambda_{high}$. Evaluate $\lambda_{low}$ and $\lambda_{high}$ to be sure that $R_{low} \leq R_{target} \leq R_{high}$.
2. Apply the bisection method to obtain $\lambda_{new}$.

$$\lambda_{new} = \frac{\overline{P}_{high} - \overline{P}_{low}}{R_{high} - R_{low}}$$

3. Determine the lookup parameter $\beta_{new}^i$ for $i=1, \ldots, N$ and obtain rate-power characteristics $\overline{P}_{new}^i$ and $R_{new}^i$ from the table.

$$\beta_{new}^i = \frac{\lambda_{new}}{CNR_i}, \quad R_{new}^i = R(\beta_{new}^i), \quad \overline{P}_{new}^j = \frac{SNR(\beta_{new}^i)}{CNR_i}$$

4. Compute the total rate for $\lambda_{new}$ and compare it to $R_{low}$, $R_{high}$, and $R_{target}$.

$$R_{new} = \sum_{i=1}^{N} R_{new}^i$$

If $R_{new}$ equals $R_{target}$, then go to step 5. Else, if $R_{new} < R_{target}$, then set $\overline{P}_{low} = \overline{P}_{new}$ and $R_{low} = R_{new}$. Go to step 2. Else, set $\overline{P}_{high} = \overline{P}_{new}$, and $R_{high} = R_{new}$. Go to step 2.

5. Complete power and rate allocation. Assign $R_{new}^i$ to the ith subchannel, and allocate power and compute the optimal performance margin as follows:

$$\overline{P}_{min} = \sum_{i=1}^{N} \overline{P}_{new}^j$$

$$P_i = \frac{P_{budget}}{\overline{P}_{min}} \overline{P}_{new}^j$$

$$\gamma_m = 10 \log_{10}\left(\frac{P_{budget}}{\overline{P}_{min}}\right)$$

There may also be situations where it is desirable to maximize the data rate with power and probability of error constraints as well as a minimum required performance margin. In this case, the performance margin, $\gamma_m$, simply scales the rate-SNR curves for the subchannels, which results in reducing the power values in the $\lambda$ look-up tables by $\gamma_m$. The algorithm is then used with the modified look-up table to obtain the optimal solution. Any residual power can be used to increase the margin of the system even further.

The look-up tables require very little computation. Artisans will appreciate that either Rate-Power look-up tables or Rate-SNR look-up tables may be used to produce identical results. The Rate-Power tables are derived from the Rate-SNR tables by scaling the slope boundaries by a subchannel's channel-to-noise ratio, CNR. The important relation is that SNR is equal to Power times CNR. Though related, the separate tables may each have implementational advantages over one another.

There is a $\lambda_{min}$ and $\lambda_{max}$ associated with the given operating point. Should any given value of $\lambda$ be between these two values, then that operating point is chosen. Each of these operating points has a maximum and minimum slope $\lambda$ value associated with it except for the point at (0,0), which really only has a $\lambda_{min}$, and the operating point with maximum rate, which only has a $\lambda_{max}$ (because $\lambda_{min}$ is infinity). As rate increases, the slope values decrease.

The difference in using Rate-Power tables and Rate-SNR tables is in how they are accessed. In the Rate-SNR case, the given value of $\lambda$ is scaled by a subchannel's CNR to obtain $\beta$, which is a "normalized" slope value. This $\beta$ value is compared to a table to obtain the point on the Rate-SNR graph at which a subchannel should operate. A rate and SNR is assigned to the subchannel, and the resulting power is obtained by dividing the assigned SNR by the CNR, i.e., P=SNR/CNR.

A major factor in using look-up tables is how to generate them. Assuming Rate-Power tables, the slope boundaries are determined by computing the slope of the lines connecting adjacent operating points, i.e., $\Delta R/\Delta P$. Again, these operating points represent the Power or SNR required to use a given signal constellation (associated with a rate in bits/symbol) that will operate below an error probability constraint. By computing all slope boundaries, one can find the optimal operating point identifying a boundary range within which a given $\lambda$ falls. Similarly, the Rate-SNR case has $\beta$ boundaries which are obtained by finding the slopes between points on the Rate-SNR graph.

Rates for a particular operating point depend upon its constellation (e.g., a constellation with 8 different symbols will represent 3 bits/symbol as $\log_2 8=3$). Its SNR is derived from theoretical performance curves for that constellation at some error probability, and its power is derived from dividing its SNR by the CNR of the particular subchannel in question. An important feature is that the Rate-SNR tables are invariant to the characteristics of the channel since the channel power gain $|H|^2$ or its noise variance $\sigma^2$ are not considered. The Rate-Power tables can be generated from the Rate-SNR tables by scaling the CNR of the channel as explained above. Rate-Power tables are not invariant to channel characteristics, and if these characteristics change, Rate-Power tables need to be recomputed from the Rate-SNR tables.

The choice of using either Rate-Power or Rate-SNR tables depends upon how much memory a system has and how much computation time it has. Using Rate-SNR curves will cost a bit more computationally, but saves memory. Some systems may require that not all subchannels have the same available signal constellations or error probability constraints. In this case, Rate-SNR tables (dependent only on the available signal constellations and error probability constraints) are different for these subchannels, and Rate-Power tables need to be derived from the appropriate Rate-SNR curve. An example of this is the delivery of video, where some data is much more important than other data, and the probability of error constraints are different.

Another alternative is the ability for the slopes to represent Power divided by Rate rather than Rate/Power. The only difference here is that all slope boundaries for lookup tables are now inverted. One advantage of this way is that the divisor is a more manageable number as it is the difference in rates, which are simple integer numbers (the difference in power can be a floating-point number requiring all the bits in a memory location to represent it). In the sectioning method of the invention, a divide operator is required, and with the divisor being a difference in rates, it might be possible to reduce the cost of the divide operation with the Power/Rate approach.

SUBOPTIMAL AND OTHER STOPPING POINTS

Artisans should also recognize that suboptimal points or arbitrary iterations may be used for stopping criteria without departing from the invention. The invention provides the ability to reach the optimal $\lambda$, but does not require it. In the case of margin maximization, where a target rate is to be met, the system stops when that target rate is met. In the case of rate maximization, the stopping criteria depends upon closeness to the power constraint without exceeding it. It is highly unlikely that the power constraint will be met list exactly, and therefore, the stopping criteria in the above pseudocode tells the system when the solution is optimal. This stopping criteria is when the exact same total rate-power combination is met for a second time. This signifies that there is no point in between the points associated with $\lambda_{low}$ and $\lambda_{high}$. Thus, the point associated with $\lambda_{low}$ is optimal as its total power is the closest without exceeding the power constraint. However, it is also conceivable to set an arbitrary maximum number of iterations based upon system knowledge. Extra power could be used to add margin to the system, or just not be used in order to save transmission cost.

ALTERNATE SECTIONING

Bisection is the first preferred sectioning method of the invention because it converges quickly and has a stopping criteria in the rate maximization case which works well. Alternative sectioning methods could be employed to search for the optimal value of $\lambda$ without departing from the scope of the invention. For example, $\lambda_{low}$ and $\lambda_{high}$ could be averaged to obtain the new slope. A weighted average of the two could be used as well. In general, methods to do slope updates in order to converge to the solution are contemplated as being within the scope of the invention.

RATE-MAXIMIZATION PRACTICAL CONSIDERATIONS

One objective goal here is to maximize the amount of bits that can be reliably sent down a channel with a given power constraint. The reliability is defined by some error probability criterion. This criterion is typically bit error probability. However, this error criterion could be a mixture of things. For one thing, some data may have different error criteria than other data.

In addition to bit error probability, i.e., the probability of a single bit being in error, another criteria could be symbol error probability, which is the probability that a symbol on a subchannel is in error. Each subchannel symbol represents a certain number of bits defined by the rate assigned to that channel. A symbol in one subchannel can represent a different number of bits than a symbol in another subchannel. However, in some situations, this criteria is more useful than bit error probability as symbols are fed into a Reed-Solomon coder, where the symbol error probability becomes a better measure of data reliability. The present invention will work for either symbol or bit error probability, or some combination of both if so desired. These criteria simply affect how the operating points are located on the rate-power (Rate-SNR) graph, and as stated earlier, an important aspect of the present invention is that it can solve for the optimal allocation for a convex, discrete set of points on the rate-power (rate-SNR) graph.

Convexity of subchannel rate-power (rate-SNR) curves is needed to guarantee that the optimal solution is always achieved. This is the usual case though. Convexity, as used herein, also applies to the cases where the negative of a concave function is convex.

PRACTICAL CONSIDERATIONS FOR MARGIN MAXIMIZATION

The primary difference in margin maximization compared to rate maximization is that a target rate is to be met rather than a power constraint. This target rate can be met with equality, and thus, the stopping criterion for the method is when the total rate equals the target rate. The updating procedure of the preferred bisection convergence is similar to rate maximization with the difference being that $\lambda_{low}$ and $\lambda_{high}$ represent a rate that is below and above the target rate rather than powers being below and above a power constraint.

The key to the margin maximization is the new optimization problem. The goal is to meet the target rate with the minimum amount of power allocated. After solving this optimization problem, the leftover power from the power constraint is used to add margin to the system. The added power to the subchannels is done by scaling the power solution of the new optimization problem by a factor of the power constraint divided by the total minimum power needed to achieve the target rate.

TRACKING SCENARIOS IN PRACTICAL SYSTEMS

Upon startup, a system is loaded with the optimal rate-power assignment according to its given constraints. During the time that data is sent along the channel, the channel conditions (power gain $|H|^2$ or noise variance $\sigma^2$) may change. The current rate-power assignment is no longer optimal, and the given optimization problem needs to be resolved. One could use the initial estimates for the $\lambda$'s upon startup, or even the worst case values discussed above.

However, since the channel usually only varies moderately, it is preferable to start with the last optimal $\lambda$ value. Seeing where its power-rate is in relation to the constraints will allow one to choose a $\lambda_{high}$ or $\lambda_{low}$ to accompany it, and apply the preferred bisection convergence or similar convergence. For example, if the last optimal $\lambda$ results in a total power below the power constraint in the rate max case, then that $\lambda$ can be assigned to $\lambda_{low}$. A $\lambda_{high}$ is needed to apply the bisection convergence. This $\lambda_{high}$ can, of course, be the worst case value or an appropriate estimate based on typical channels.

NOISE POWER CONSIDERATIONS

The noise power in a subchannel is a function of the signal constellation. In QAM, the noise power is $2\sigma^2$. This may not be the case in all signal constellations. When one bit/symbol is sent using Binary Phase Shift Keying (BPSK), the noise power affecting the received signal is only $\sigma^2$. In some instances, the noise power is twice the variance. In others, the power is equal to the noise variance.

TRANSMIT POWER MASKS

In some situations, there are specifications which limit how much power can be sent at a certain frequency (e.g., a FCC restriction). In these situations, a transmit power mask is an upper bound on the amount of average power that can be sent. For example: if an allocation gives 50 units of power to a subchannel, and the power mask provides that frequency can only have 40, then the system can only use 40 to follow these constraints.

The present invention allows incorporation of the mask into the power allocation, and permits the optimal allocation to be subject to the power mask. Whenever a $\lambda$ dictates allocation of power to a subchannel which is above the mask at that frequency, the system simply allocates a lower rate (and thus lower power) to that subchannel so that its power is equal to or below the mask. This is a straightforward alteration, especially if one is using rate-power tables rather than rate-SNR tables.

Assuming the mask at subchannel i is M(i), if P(i)<M(i), then a lower rate is chosen such that the power is below the mask. If rate-power tables are used, one can simply search through the list in order to find the first rate (below what $\lambda$ points to) such that the power constraint is met. Although the term "power mask" is used, this concept is essentially a power constraint which could vary among the subchannels and can be compensated for using the method of the invention.

CONVERGING LOOK-UP TABLES

The section convergence closes the gap for the total rate-power allocation, and it also closes the gap on each of the individual subchannels. The following refers to an individual subchannel and not the total rate-power allocation of the system.

Assume a subchannel can have anything from 0–10 bits/symbol (on the integers). Assume that the optimal operating point for this subchannel is 5 bits/symbol. $\lambda_{low}$ will (at worst case) start at 0 bits/symbol, while $\lambda_{high}$ will start (at worst case) at 10 bits/symbol. When we begin to converge towards the optimal $\lambda$, $\lambda_{low}$ will represent a rate which increases from 0 to 5, and $\lambda_{high}$ will represent a rate which decreases from 10 to 5. Both $\lambda_{low}$ and $\lambda_{high}$ will converge to 5 bits/symbol, but this could happen before the final optimal $\lambda$ is found. In fact, most subchannels have converged (i.e., Rate($\lambda_{low}$)=Rate($\lambda_{high}$)) in the first two to three or so iterations needed to find the optimal rate-power allocation.

Reduction in complexity is realized in part because these subchannels no longer need to be examined once they converge, as any $\lambda$ between the current $\lambda_{low}$ and $\lambda_{high}$ will result in the same rate. Therefore, a computational savings can result by keeping track of which subchannels have converged and which have not. This can be done by assigning a pointer which identifies the next subchannel to consider. For example, a pointer system of all ones can be initialized, and the system can look at the next subchannel. As subchannels converge, the number of subchannels between subchannels that have not converged can be stored, so after evaluating one of these, the system can proceed to the next nonconverged subchannel.

Another concept with these convergent look-up tables is that searching the look-up tables can be made easier by realizing that for $\lambda_{new}$ chosen by the section algorithm, the new operating point associated with $\lambda_{new}$ must have a greater than or equal rate and power than $\lambda_{low}$ and a less than or equal rate and power than $\lambda_{high}$. In simpler terms, this means that the available operating points for $\lambda_{new}$ are bounded above and below by the points associated with $\lambda_{high}$ and $\lambda_{low}$. It is thus faster to search the look-up tables for the right operating point. Moreover, searching becomes easier as the process progresses, since there has to be convergence by the low and high slopes to a single operating point.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for allocating transmission performance quantities among discrete multicarrier modulation communication channels, the method comprising steps of:

determining and storing a set of Lagrange multiplier $\lambda$ data correlating bit rate to allocated power for a plurality of subchannels;

choosing a starting value of $\lambda$, and high and low values surrounding $\lambda$;

evaluating $\lambda$ to determine its performance based upon stored allocated performance quantity data;

updating $\lambda$ with a section search that alters one of the high and low values to converge toward $\lambda$;

repeating said steps of updating and evaluating until one of the following conditions is demonstrated by said step of evaluating,
   (a) a newly chosen $\lambda$ meets a performance quantity budget indicated by said performance quantity data;
   (b) a newly chosen $\lambda$ equals a previous high or low value for $\lambda$, or
   (c) a predetermined number of updates have been conducted; and allocating a performance quantity based upon the $\lambda$ meeting a condition defined in said step of repeating.

2. The method according to claim 1, wherein said step of updating performs a bisection search.

3. The method according to claim 2, wherein said performance quantity comprises a target power budget.

4. The method according to claim 2, wherein said performance quantity comprises a target bit rate.

5. The method according to claim 1, wherein said performance quantity comprises a target power budget.

6. The method according to claim 1, wherein said performance quantity comprises a target bit rate.

7. The method according to claim 1, wherein said step of evaluating comprises evaluating λ to find the optimal operating point for every communication system subchannel for each rate-power curve point by summing performance quantity allocated to every communication system subchannel and comparing the result to a target performance quantity.

8. A method for allocating power among discrete multicarrier modulation communication channels, the method comprising steps of:

defining a look-up table having parameters defining an optimal operating points on bit rate versus signal-to-noise ratio curves for a plurality of subchannels; and finding a line for given slope λ tangent to any one signal to noise ratio curve to allocate power to an associated subchannel for a predetermined power budget by,
  (a) selecting predetermined high and low slopes above and below the power budget; and
  (b) performing an iterative section search between high and low slopes to determine an optimal power allocation.

9. The method according to claim 8, wherein said substep of performing comprises:

computing a new slope which bisects the predetermined high and low slopes;

comparing to find whether the new slope is above or below the power budget; then updating the high slope with the new slope if the new slope exceeds the power budget;

updating the low slope with the new slope if the new slope is less than the power budget; and repeating said computing, comparing and said updating until the new slope equals either the high slope, the low slope or a power budget, or a predetermined number of iterations have been conducted.

10. A method for allocating bit rate among discrete multicarrier modulation communication channels, the method comprising steps of:

defining a look-up table having parameters defining optimal operating points on bit rate versus signal-to-noise ratio curves for a plurality of subchannels; and finding a slope tangent to any one signal to noise ratio curve to allocate bit rate to an associated subchannel for a predetermined power by,
  (a) selecting predetermined high and low slopes above and below rate-power characteristics for the slope;
  (b) evaluating bit rate from the look-up table for the slope; and
  (c) performing an iterative section search to converge between high and low slopes to determine an optimal bit rate.

11. The method according to claim 10, wherein said section search is a bisection search.

12. A method for allocating bit rate among discrete multicarrier modulation communication channels, the method comprising steps of:

(a) obtaining initial values of $\lambda_{low}$ and $\lambda_{high}$, (b) calculate the following equations:

$$\beta_{low}^i = \frac{\lambda_{low}}{CNR_i};$$

$$\beta_{high}^i = \frac{\lambda_{high}}{CNR_i};$$

$$\overline{P}_{low}^i = \frac{SNR(\beta_{low}^i)}{CNR_i}, \quad \overline{P}_{low} = \sum_{i=1}^{N} \overline{P}_{low}^i$$

$$\overline{P}_{high}^i = \frac{SNR(\beta_{high}^i)}{CNR_i}, \quad \overline{P}_{high} = \sum_{i=1}^{N} \overline{P}_{high}^i$$

$$R_{low}^i = R(\beta_{low}^i), \quad R_{low} = \sum_{i=1}^{N} R_{low}^i$$

$$R_{high}^i = R(\beta_{high}^i), \quad R_{high} = \sum_{i=1}^{N} R_{high}^i$$

(c) verify that $R_{low} \leq R_{target} \leq R_{high}$; if it is, go to (d); if not, go back to (b) with new estimates of $\lambda_{low}$ and $\lambda_{high}$;

(d) calculating $\lambda_{new}$, where $$\lambda_{new} = \frac{\overline{P}_{high} - \overline{P}_{low}}{R_{high} - R_{low}}$$

(e) determining a lookup parameter $\beta_i$ for i=1, ... N from stored data and obtaining rate-power characteristics $\overline{P}_{new}^i$ and $R_{new}^i$ from a stored look-up table using the lookup parameter $\beta_i$, where $$\beta_{new}^i = \frac{\lambda_{new}}{CNR_i}, \quad R_{new}^i = R(\beta_{new}^i), \quad \overline{P}_{new}^i = \frac{SNR(\beta_{new}^i)}{CNR_i}$$

(f) computing the total rate for $\lambda_{new}$ and comparing it to $R_{low}$, $R_{high}$, and $R_{target}$;

$$R_{new} = \sum_{i=1}^{N} R_{new}^i, \quad \overline{P}_{new} = \sum_{i=1}^{N} \overline{P}_{new}^i$$

if $R_{new}$ equals $R_{target}$, then go to step (g), else, if $R_{new} < R_{target}$, then set $\overline{P}_{low} = \overline{P}_{new}$ and $R_{low} = R_{new}$ and go to step (d), else, set $\overline{P}_{high} = \overline{P}_{new}$ and $R_{high} = R_{new}$ and go to step (d); and (g) completing rate allocation by assigning $R_{new}^i$ to the ith subchannel, allocating power and computing the optimal performance margin $\gamma_m$ (dB) as $$P_i = \frac{P_{budget}}{\overline{P}_{min}} \overline{P}_{new}^i$$

$$\gamma_m dB = 10\log_{10}\left(\frac{P_{budget}}{\overline{P}_{min}}\right).$$

13. The method according to claim 12, wherein said initial values are chosen based upon prior operating knowledge.

14. The method according to claim 12, wherein said initial low and high values are respectively set to zero and infinity.

15. The method according to claim 12, wherein said initial values are based upon estimates related to general communication system knowledge.

16. A method for allocating power among discrete multicarrier modulation communication channels, the method comprising steps of:

(a) obtaining initial values of $\lambda_{low}$ and $\lambda_{high}$;
(b) calculate the following equations:

$$\beta_{low}^i = \frac{\lambda_{low}}{CNR_i};$$

$$\beta_{high}^i = \frac{\lambda_{high}}{CNR_i};$$

$$P_{low}^i = \frac{SNR(\beta_{low}^i)}{CNR_i}, P_{low} = \sum_{i=1}^{N} P_{low}^i;$$

$$P_{high}^i = \frac{SNR(\beta_{high}^i)}{CNR_i}, P_{high} = \sum_{i=1}^{N} P_{high}^i;$$

$$R_{low}^i = R(\beta_{low}^i), R_{low} = \sum_{i=1}^{N} R_{low}^i$$

$$R_{high}^i = R(\beta_{high}^i), R_{high} = \sum_{i=1}^{N} R_{high}^i$$

(c) verify that $P_{low} \leq P_{budget} \leq P_{high}$; if it is, go to (d); if not, go back to (b) with new estimates of $\lambda_{low}$ and $\lambda_{high}$;
(d) calculating a $\lambda_{new}$, where $$\lambda_{new} = \frac{P_{high} - P_{low}}{R_{high} - R_{low}}$$

(e) determining a lookup parameter $\beta_i$ for i=1, ... N from stored data and obtaining rate-power characteristics $P_{new}^i$ and $R_{new}^i$ from a stored look-up table using the lookup parameter $\beta_i$, where $$\beta_{new}^i = \frac{\lambda_{new}}{CNR_i}, R_{new}^i = R(\beta_{new}^i), P_{new}^i = \frac{SNR(\beta_i)}{CNR_i}$$

(f) computing the total power allocation for $\lambda_{new}$ and comparing it to $P_{low}$, $P_{high}$, or $P_{target}$, as follows:

$$P_{new} = \sum_{i=1}^{N} P_{new}^i, R_{new} = \sum_{i=1}^{N} R_{new}^i$$

if $P_{new}$ equals either $P_{low}$, $P_{high}$, or $P_{budget}$ then go to step (g), else, if $P_{new} < P_{budget}$, then set $P_{low} = P_{new}$ and $R_{low} = R_{new}$, store $P_{low}^i$ and $R_{low}^i$ and go to step (d), else, set $P_{high} = P_{new}$, and $R_{high} = R_{new}$ and go to step (d); and (g) assigning $P_{new}^i$ and $R_{new}^i$ to the ith subchannel if $P_{new} = P_{budget}$, otherwise assigning $P_{low}^i$ and $R_{low}^i$ to the ith subchannel.

17. The method according to claim 16, wherein said initial values are chosen based upon prior operating knowledge.

18. The method according to claim 16, wherein said initial low and high values are respectively set to zero and infinity.

19. The method according to claim 16, wherein said initial values are based upon estimates related to general communication system knowledge.

* * * * *

UNITED STATES PATENT AND TRADEMARK OFFICE
CERTIFICATE OF CORRECTION

PATENT NO.    : 6,400,773 B1
DATED         : June 4, 2002
INVENTOR(S)   : Krongold et al.

It is certified that error appears in the above-identified patent and that said Letters Patent is hereby corrected as shown below:

Column 1,
Line 2, please insert the following paragraph after the title:

-- STATEMENT OF GOVERNMENT INTEREST

This invention was made with Government support under Contract Nos. N00014-97-1-0864 and N00014-96-0129 awarded by the Department of the Navy. The government has certain rights in this invention. --

Column 3,
Line 46, delete "1" and insert -- 12 -- therefor

Column 4,
Line 61, delete "$\geqq$" and insert -- $\geq$ -- therefor

Column 8,
Line 7, delete "$\leqq$" and insert -- $\leq$ -- therefor

Column 9,
Line 43, delete "$\leqq$" and insert -- $\leq$ -- therefor

Column 11,
Line 42, delete "list"

Column 13,
Line 41, delete "<" and insert -- > -- therefor

Column 16,
Line 1, delete "calculate" and insert -- calculating -- therefor

UNITED STATES PATENT AND TRADEMARK OFFICE
CERTIFICATE OF CORRECTION

PATENT NO. : 6,400,773 B1
DATED : June 4, 2002
INVENTOR(S) : Krongold et al.

It is certified that error appears in the above-identified patent and that said Letters Patent is hereby corrected as shown below:

Column 17,
Line 21, delete "≦" and insert -- ≤ -- therefor

Signed and Sealed this

Sixth Day of May, 2003

JAMES E. ROGAN
*Director of the United States Patent and Trademark Office*